R. FIDLER & P. NAPIER.
ATTACHMENT FOR VEHICLES.
APPLICATION FILED FEB. 20, 1914.
1,106,445.
Patented Aug. 11, 1914.
2 SHEETS—SHEET 1.
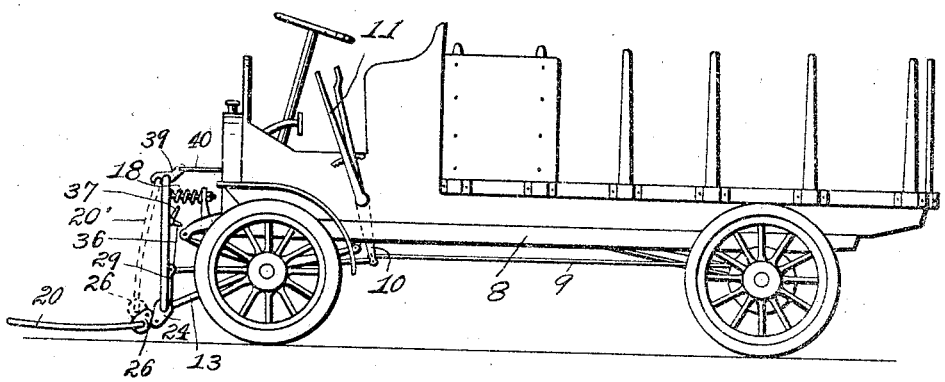

R. FIDLER & P. NAPIER.
ATTACHMENT FOR VEHICLES.
APPLICATION FILED FEB. 20, 1914.
1,106,445.
Patented Aug. 11, 1914.
2 SHEETS—SHEET 2.
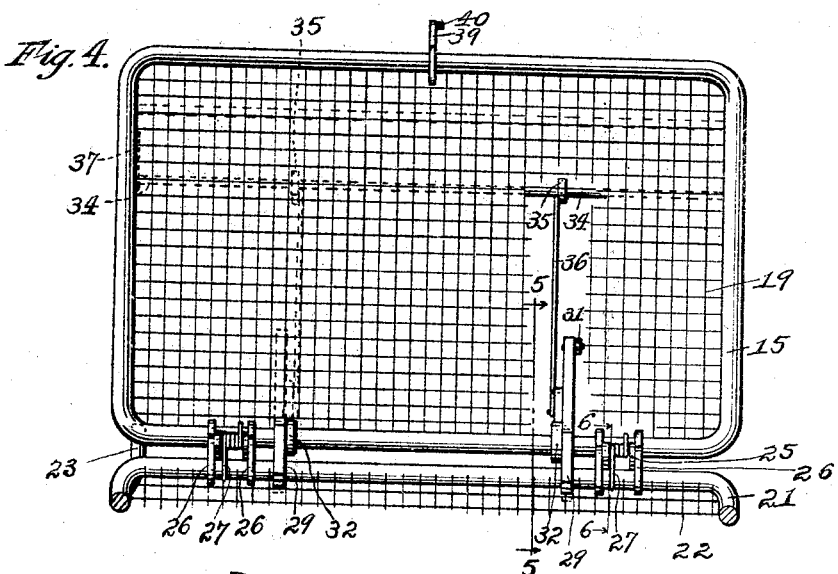
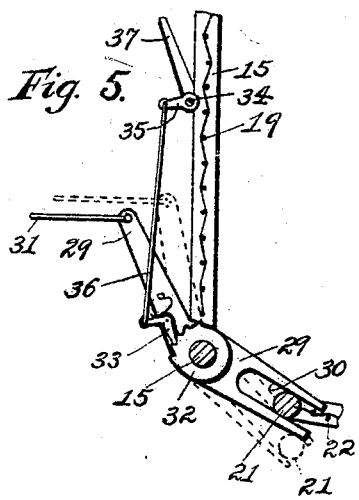
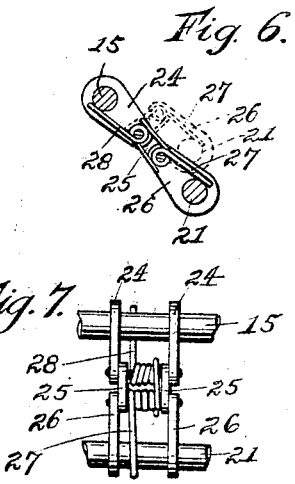
Witnesses:
T. Colson,
H. S. Bull
Inventors:
Robert Fidler,
Peter Napier,
By Joshua R. H. Potts
their Attorney.

UNITED STATES PATENT OFFICE.

ROBERT FIDLER AND PETER NAPIER, OF CHICAGO, ILLINOIS.

ATTACHMENT FOR VEHICLES.

1,106,445.  Specification of Letters Patent.  Patented Aug. 11, 1914.

Application filed February 20, 1914. Serial No. 819,948.

*To all whom it may concern:*

Be it known that we, ROBERT FIDLER and PETER NAPIER, citizens of the United States, and residents of the city of Chicago, county of Cook, and State of Illinois, have invented a certain new and useful Attachment for Vehicles, of which the following is a specification.

Our invention relates to attachments for vehicles and more particularly to attachments for motor driven vehicles.

The object of this invention is to provide a simple and effective attachment of the character mentioned embodying a fender connected with an automobile, or the like, and having a connection connecting the fender with the conventional brake system of such automobile to cause setting of the brakes upon an obstacle encountering said fender.

Other objects will appear hereinafter.

The invention consists in the combinations and arrangements of parts hereinafter described and claimed.

The invention will be best understood by reference to the accompanying drawings forming a part of this specification, and in which—

Figure 1 is a side elevation of an automobile truck equipped with a fender and attachment embodying our invention, Fig. 2 is an enlarged fragmental section through the fender and foremost part of the automobile, Fig. 3 is a view similar to Fig. 2 except with the fender shown in lowered condition, Fig. 4 is an enlarged front view of a portion of the fender and connecting parts, Fig. 5 is an enlarged section taken on line 5—5 in Fig. 4, Fig. 6 is an enlarged section taken on line 6—6 in Fig. 4, and Fig. 7 is an enlarged fragmental view showing the supporting hinge of the fender in extended condition.

The preferred form of construction as illustrated in the accompanying drawings comprises an automobile 8, of conventional design and equipped with a brake of any ordinary or preferred design having a brake rod 9 connected therewith. The brake rod 9 is connected by means of an arm 10 with the brake lever 11 in the ordinary manner. These parts are not altered in any manner upon applying our improvement to an automobile.

Connected with the front axle 12 of the automobile are supporting members 13, one at each side of the automobile, connected substantially as indicated in Figs. 2 and 3. A brace member 14 is secured to the support 13 and a convenient portion of the frame to maintain the support 13 in rigid condition. At the forward end of support 13 is carried a frame 15, made of pipe or any other suitable substance. The connection between the frame 15 and supports 13 is a hinge connection permitting of forward and rearward swinging of the frame 15. Near the upper portion of frame 15 are carried rearwardly projecting arms 16 slidably mounted in brackets 17. Springs 18 are provided on the arms 16 and adapted to maintain the frame 15 at its forward terminal of swinging movement. The frame 15 is covered by wire fabric 19 or any suitable substance, and provides the usual bumper for an automobile.

A fender 20 is formed of a frame 21 and a wire fabric 22, or its equivalent, and pivoted along its rear side to the lower portion of the frame 15, the lower horizontal portion of said frame providing the support for said fender 20. At one side of the frame 21 is provided an arm 23 rigidly secured thereto and adapted to engage under a corresponding portion of frame 15 to maintain the fender 20 in substantially horizontal condition.

The hinges connecting fender 20 with the lower bar part of frame 15, each comprise two links 24 secured rigidly to the frame 15, two links 25 pivotally connected to the forward ends of links 24 and two links 26 pivotally connected to the forward ends of links 25 and also pivotally connected with the frame 21 of said fender. The pintles of the pivotal connections between the links of said hinges provide rods around which springs 27 and 28 are supported. The ends of spring 27 engage the upper side of frame 21 and the upper side of the pintles between linkes 25 and 24 and the ends of spring 28 engage the under sides of the frame 15 and the under side of the pintle between links 25 and 26, the arrangement being such that the springs normally maintain links 24, 25 and 26 in folded or overlapped condition, such as indicated in Figs. 1 and 2. This form of spring permits of both longitudinal and downward movement, with respect to the automobile.

Pivotally mounted on the lower bar of frame 15 adjacent the hinges between said frame and fender 20 are levers 29. The forward ends of levers 29 are slotted, as at 30, said slots engaging the frame 21, and are adapted to swing said levers upon movement either downwardly or rearwardly of said fender. The upper and rearward ends of said levers are each connected to the lever 10 by means of a connecting rod 31, to independently operate said last mentioned lever upon an obstacle contacting with either side of said fender.

Adjacent each lever 29 and rigidly fixed on the lower bar of frame 15 is a ratchet member 32 and on each lever 29 is pivoted a pawl 33 coöperating with said ratchets 32, the arrangement being such that upon downward or rearward movement of said fender, the pawl 33 will engage the teeth of ratchet members 32, preventing the return of said levers and fender to their normal positions. This arrangement prevents the loosening of the brakes of the automobile until after the obstacle has been removed from its contact with said fender. Journaled on the rear side of the frame 15 is a rod 34. Carried on said rod 34 are arms 35 and the latter are connected by means of connecting rods 36 with the pawls 33. A hand operable lever 37 is also fixed on the shaft 34 so that after the obstacle has been removed from the fender 20, the operator of the automobile may upon forward rocking of said lever 37, raise the pawls 33 from their engagement with ratchet members 32 to permit springs 27 and 28 to return the fender and levers 29 to their normal positions. The arm 23 engages the under side of frame 15, as already explained, and facilitates the returning of fender 20 to its normal condition, as will be readily understood.

When it is not desired to use the fender, the same may be folded to upright position such as indicated by the dotted lines 20' in Fig. 1. In the upper side of frame 15 is provided a catch 39 adapted to automatically engage the front edge of the fender to lock the same in said dotted line position. A cord, or its equivalent, 40 is connected with the catch 39 and extended to a suitable position with respect to the driver of the automobile so that the fender may be dropped by gravity upon manually unlocking the catch 39 from its engagement with said fender.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. The combination with a vehicle having a brake, of a support carried by said vehicle; an obstacle engaging member pivoted to said support; a lever pivoted on said support and having one end connected with said obstacle engaging member; an operative connection between said brake and the other end of said lever; a ratchet rigidly secured on said support; and a pawl carried by said lever and adapted to coöperate with said ratchet, substantially as described.

2. The combination with a vehicle having a brake, of a support carried by said vehicle; an obstacle engaging member pivoted to said support; a lever pivoted on said support and having one end connected with said obstacle engaging member; an operative connection between said brake and the other end of said lever; a ratchet rigidly secured on said support; a pawl carried by said lever and adapted to coöperate with said ratchet; and means for disengaging said pawl from said ratchet, substantially as described.

3. The combination with a vehicle having a brake, of a support carried by said vehicle; an obstacle engaging member pivoted on said support and adapted to yield downwardly; a lever pivoted on said support and having one end bifurcated and engaging said obstacle member; an operative connection between the other end of said lever and said brake; a ratchet rigidly secured on said support; and a spring pressed pawl carried by said lever, coöperating with said ratchet and adapted to lock said brake in operative condition upon depression of said obstacle engaging member, substantially as described.

4. The combination with a vehicle having a brake, of a support carried by said vehicle; an obstacle engaging member pivoted on said support and adapted to yield downwardly; a lever pivoted on said support and having one end bifurcated and engaging said obstacle member; an operative connection between the other end of said lever and said brake; a ratchet rigidly secured on said support; a spring pressed pawl carried by said lever, coöperating with said ratchet and adapted to lock said brake in operative condition upon depression of said obstacle engaging member; a manually operable lever; and a connecting link connecting said lever with said pawl and adapted to release the latter from said ratchet to release the brake, substantially as described.

5. The combination with a vehicle having a brake, of an obstacle engaging member operatively connected with said brake; and hinge members supporting said obstacle engaging member, each of said hinge members comprising a rigidly secured portion, a portion pivoted to said obstacle engaging member, a portion pivoted to both of said other portions, and springs normally holding said first and second mentioned portions in overlapped relation, substantially as described.

6. The combination with a vehicle having a brake, of a support carried by said vehicle; an obstacle engaging member; a spring hinge connecting said support and said obstacle engaging member and permitting downward movement of the latter; a lever pivoted on said support and having one end bifurcated and engaging said obstacle member, said spring hinge holding said obstacle engaging member in the bifurcated end of said lever; a ratchet rigidly secured on said support; and a spring pressed pawl carried by said lever, coöperating with said ratchet and adapted to lock said brake in operative condition upon depression of said obstacle engaging member, substantially as described.

In testimony whereof we have signed our names to this specification in the presence of two subscribing witnesses.

ROBERT FIDLER.
PETER NAPIER.

Witnesses:
JOSHUA R. H. POTTS,
HELEN F. LILLIS.